(12) United States Patent
Höchsmann et al.

(10) Patent No.: US 7,748,971 B2
(45) Date of Patent: Jul. 6, 2010

(54) METHOD AND DEVICE FOR APPLYING FLUIDS

(75) Inventors: Rainer Höchsmann, Genderkingen (DE); Alexander Kudernatsch, Augsburg (DE)

(73) Assignee: Voxeljet Technology GmbH, Augsburg (DE)

( * ) Notice: Subject to any disclaimer, the term of this patent is extended or adjusted under 35 U.S.C. 154(b) by 1113 days.

(21) Appl. No.: 10/510,543

(22) PCT Filed: Apr. 8, 2003

(86) PCT No.: PCT/DE03/01148

§ 371 (c)(1),
(2), (4) Date: Oct. 17, 2005

(87) PCT Pub. No.: WO03/086726

PCT Pub. Date: Oct. 23, 2003

(65) Prior Publication Data

US 2006/0105102 A1    May 18, 2006

(30) Foreign Application Priority Data

Apr. 11, 2002    (DE) ................. 102 16 013

(51) Int. Cl.
  *B28B 1/16*    (2006.01)
  *B05C 1/06*    (2006.01)
(52) U.S. Cl. .................. 425/90; 425/375; 118/110; 118/256; 118/258
(58) Field of Classification Search ............ 425/174.4, 425/375, 90; 264/113, 497, 308, 401; 118/110, 118/256, 258; 427/600
See application file for complete search history.

(56) References Cited

U.S. PATENT DOCUMENTS

| | | | |
|---|---|---|---|
| 2,640,629 A | 6/1953 | McDonald et al. | |
| 2,692,142 A | 10/1954 | Hunter | |
| 2,857,938 A | 10/1958 | Wahl | |
| 3,616,969 A | 11/1971 | Koizumi | |
| 3,616,972 A | 11/1971 | Christy | |
| 3,815,527 A | 6/1974 | Dobbins | |
| 3,913,503 A | 10/1975 | Becker | |
| 3,964,386 A * | 6/1976 | Dini ......................... | 101/169 |
| 4,239,715 A | 12/1980 | Pratt | |

(Continued)

FOREIGN PATENT DOCUMENTS

DE    4325573 C2    2/1995

(Continued)

OTHER PUBLICATIONS

Cima et al., "Computer-derived Microstructures by 3D Printing: Bio-and Structural Materials," SFF Symposium, Austin, TX, 1994.

(Continued)

*Primary Examiner*—Maria Veronica D Ewald
(74) *Attorney, Agent, or Firm*—Dobrusin & Thennisch PC

(57) ABSTRACT

This invention relates to a method for use in dispensing fluids especially particulate matter on to a surface to be coated, comprising a blade traversing along said surface, whereby the fluid is dispensed in front of said blade on to said surface, whereafter said blade is swept across the dispensed fluid such that it imparts vibrations. The fluid (5) is fed on to said surface through the bottom outlet of a container (3) vibrated cooperatively with the blade (7).

1 Claim, 3 Drawing Sheets

U.S. PATENT DOCUMENTS

| | | | |
|---|---|---|---|
| 4,279,949 A | 7/1981 | Esser |
| 4,369,025 A | 1/1983 | Von Der Weid |
| 4,579,252 A | 4/1986 | Wilson |
| 4,630,755 A | 12/1986 | Campbell |
| 4,630,765 A | 12/1986 | Campbell |
| 4,669,634 A | 6/1987 | Leroux |
| 4,889,433 A | 12/1989 | Pratt |
| 4,938,816 A | 7/1990 | Beaman et al. |
| 5,017,753 A | 5/1991 | Deckard |
| 5,053,090 A | 10/1991 | Beaman et al. |
| 5,132,143 A | 7/1992 | Deckard |
| 5,204,055 A | 4/1993 | Sachs et al. |
| 5,248,249 A * | 9/1993 | Yamamoto et al. ....... 425/174.4 |
| 5,252,264 A | 10/1993 | Forderhase et al. |
| 5,316,580 A | 5/1994 | Deckard |
| 5,340,656 A | 8/1994 | Sachs et al. |
| 5,354,414 A | 10/1994 | Feygin |
| 5,387,380 A | 2/1995 | Cima et al. |
| 5,433,520 A | 7/1995 | Adams |
| 5,506,607 A | 4/1996 | Sanders, Jr. et al. |
| 5,597,589 A | 1/1997 | Deckard |
| 5,601,868 A | 2/1997 | Gerhardt |
| 5,616,294 A | 4/1997 | Deckard |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A * | 9/1997 | Serbin et al. ............. 425/174.4 |
| 5,934,343 A | 8/1999 | Gaylo et al. |
| 6,030,199 A * | 2/2000 | Tseng ........................ 425/132 |
| 6,036,777 A | 3/2000 | Sachs |
| 6,094,994 A | 8/2000 | Satake et al. |
| 6,147,138 A | 11/2000 | Hochsmann et al. |
| 6,305,769 B1 | 10/2001 | Thayer et al. |
| 6,316,060 B1 | 11/2001 | Elvidge et al. |
| 6,322,728 B1 | 11/2001 | Brodkin et al. |
| 6,416,850 B1 | 7/2002 | Bredt et al. |
| 6,733,267 B2 * | 5/2004 | Chapman et al. ......... 425/174.4 |
| 6,764,636 B1 | 7/2004 | Allanic et al. |
| 2004/0170795 A1 | 9/2004 | Ederer et al. |
| 2006/0105102 A1 | 5/2006 | Hochsmann et al. |
| 2006/0175346 A1 | 8/2006 | Ederer et al. |

FOREIGN PATENT DOCUMENTS

| | | |
|---|---|---|
| DE | 4400523 A1 | 7/1995 |
| DE | 10117875 | 1/2003 |
| DE | 10216013 | 10/2003 |
| EP | 0431924 B1 | 6/1991 |
| EP | 0688262 | 12/1995 |
| EP | 0739666 | 10/1996 |
| EP | 1415792 A2 | 5/2004 |
| EP | 1442870 A1 | 8/2004 |
| FR | 2790418 A1 | 9/2000 |
| GB | 2382798 | 11/2003 |
| WO | 95/18715 A1 | 7/1995 |
| WO | 96/05038 A1 | 2/1996 |
| WO | 00/21736 A1 | 4/2000 |
| WO | 00/51809 A1 | 9/2000 |
| WO | 01/26885 A1 | 4/2001 |
| WO | 01/72502 A1 | 4/2001 |
| WO | 01/34371 A2 | 5/2001 |
| WO | 02/26419 A1 | 4/2002 |
| WO | 02/26420 A1 | 4/2002 |
| WO | 02/064353 A1 | 8/2002 |
| WO | 02/064354 A1 | 8/2002 |
| WO | 02/083323 A2 | 10/2002 |
| WO | 03/016030 A1 | 2/2003 |
| WO | 03/016067 A2 | 2/2003 |
| WO | 03/086726 A1 | 10/2003 |
| WO | 03/097518 A2 | 11/2003 |
| WO | 03/103932 A1 | 12/2003 |
| WO | 2004/010907 A1 | 2/2004 |
| WO | 2004/112988 A2 | 12/2004 |
| WO | 2005/080010 A1 | 9/2005 |
| WO | 2005/113219 A1 | 12/2005 |

OTHER PUBLICATIONS

EOS Operating Manual for Laser Sintering Machine with Brief Summary.

Sachs et al., "Three-Dimensional Printing: Rapid Tooling and Prototypes Directly from a CAD Model", Massachusetts Institute of Technology, pp. 131-136.

Sachs et al., "Three-Dimensional Printing: Rapid Tooling and Prototypes Directly from a CAD Model", Massachusetts Institute of Technology, pp. 143-151.

Jacobs et al., 2005 SME Technical Paper, title "Are QuickCast Patterns Suitable for Limited Production?".

Feature Article—Rapid Tooling—Cast Resin and Sprayed Metal Tooling by Joel Segal.

Williams, "Feasibility Study of Investment Casting Pattern Design by Means of Three Dimensional Printing", Department of Machanical Enginerring, pp. 2-15.

Copending National Phase Application, WO 02/083323, (1156-007), Oct. 24, 2002.

Copending National Phase Application, WO 03/086726 (1156-008), Oct. 17, 2005.

Copending National Phase Application, WO 03/097518 (1156-010), Jun. 24, 2005.

Copending National Phase Application, WO 05/080010 (1156-012), Sep. 1, 2005.

Gephart, Rapid Prototyping, pp. 118-119.

Marcus et al., Solid Freedom Fabrication Proceedings, Nov. 1993.

Opposition of Patent No. DE10047614, Jun. 25, 2003.

Opposition to European Patent No. 1322458 B1, Jan. 19, 2005.

International Search Report, PCT/DE02/01103, (Published as WO2002/083323), Sep. 30, 2002.

International Search Report, PCT/DE00/03324, (Published as WO2002/026419), Jun. 5, 2001.

International Search Report, PCT/DE01/03661, (Published as WO2002/026420), Feb. 28, 2002.

Marcus, et al., Solid Freeform Fabrication Proceedings, Sep. 1995, p. 130-33.

* cited by examiner

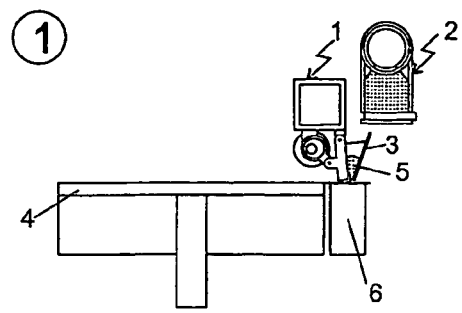
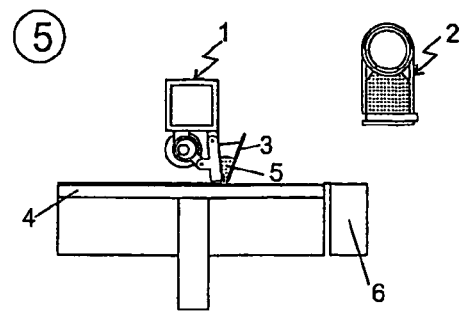
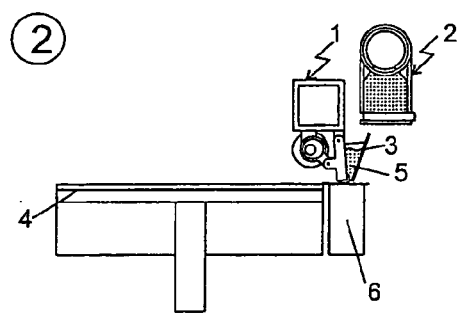
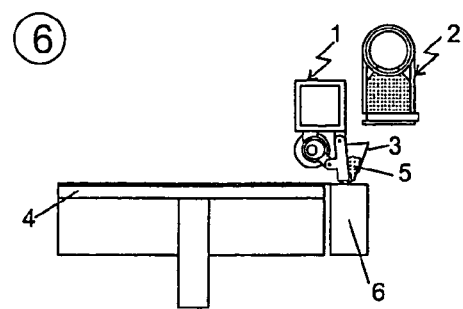
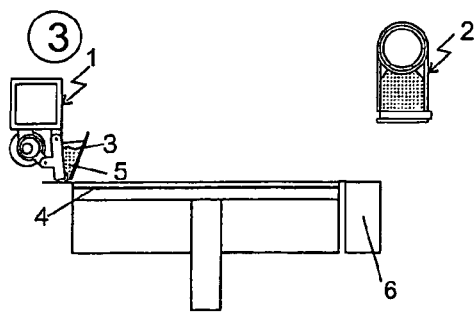
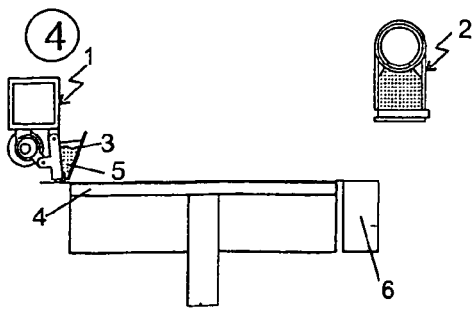
Fig. A

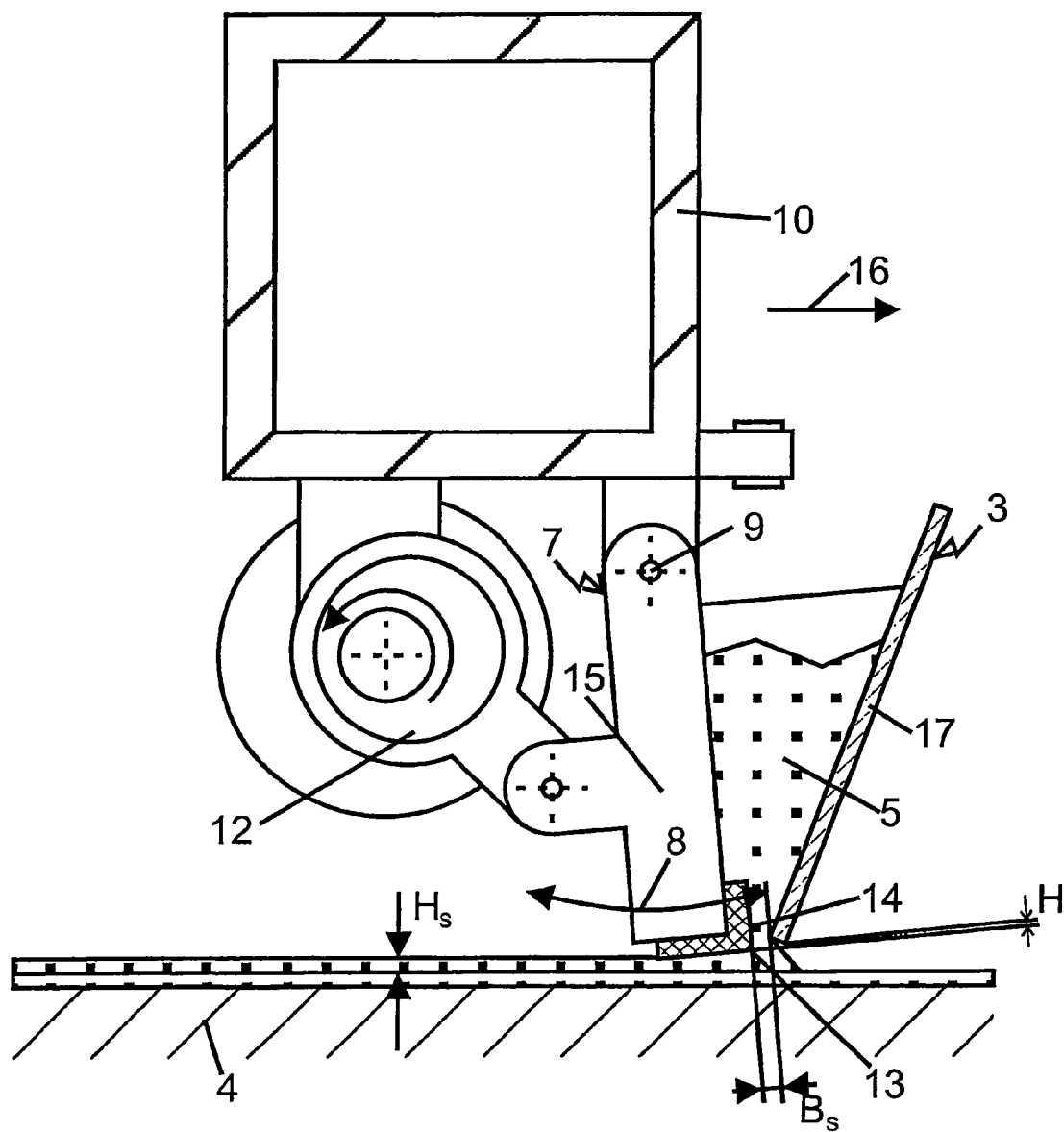
Fig. B

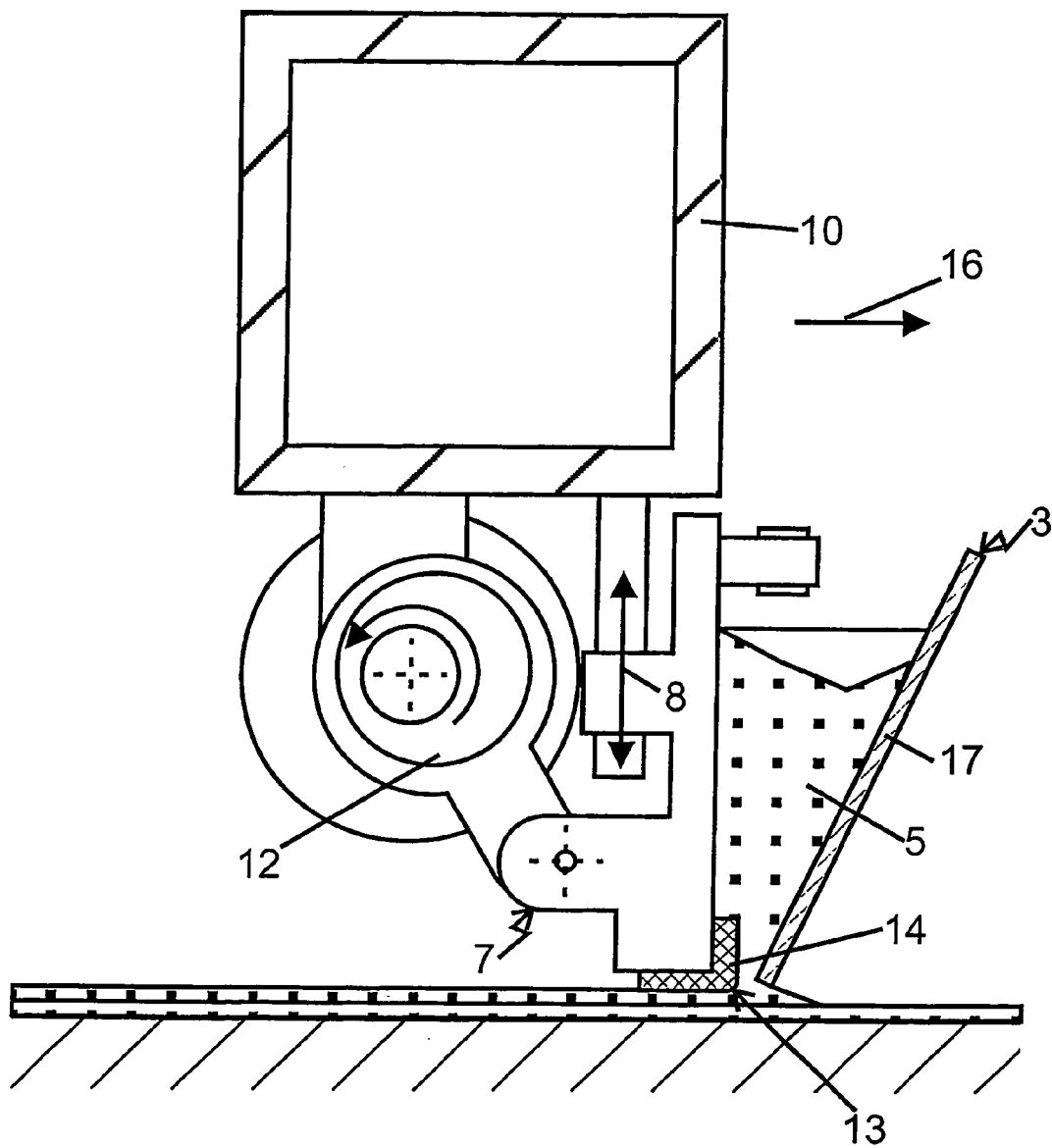
Fig. C

METHOD AND DEVICE FOR APPLYING FLUIDS

CLAIM OF BENEFIT OF FILING DATE

The present application claims the benefit of the filing date of PCT Application Serial No. PCT/DE03/01148, (filed Apr. 8, 2003) (published as WO 03/086726) and DE 102 16013.9 (filed Apr. 11, 2002), the contents of which are hereby incorporated by reference in their entirety.

This invention relates to a method and an apparatus for dispensing fluids according to the main independent claims 1 and 7, and to the application of such an apparatus.

Dispensing of fluids and especially particulate matter in thin layers is of major importance in many technological fields, where it is often necessary to ensure that the dispensed layer's surface is as uniform as possible. This is critical, for example, in rapid prototyping processes when deposited particulate matter has to be bonded.

Rapid prototyping for pattern building is known, for instance, through German patent application DE 198 53 834 directed at dispensing untreated particulate matter in a thin layer on to a working surface, whereafter the finest possible layer of a binder is sprayed all over the particles, followed by a curing agent appropriately metered and applied to bond selected areas of the particulate matter. Repeating this procedure several times enables a specific pattern of bonded particulate matter to be produced.

If for example, quartz sand is used as the particulate matter and furan resin as the binder for such a rapid prototyping technique, a sulfurous acid can be applied as the hardener to produce molds comprising typical materials and production methods known to those skilled in the art.

In such known techniques, where the smallest unit layer thickness governs the precision with which the mold can be produced, it is often difficult to achieve the most uniform and thin layer of particulate matter possible.

From patent EP 0 538 244 B1, for example, a method is known for depositing a layer of powder on to a surface, whereby the powder is fed on to and a roller swept across the surface as said roller is rotated counter to its direction of linear movement across said surface. The counter rotating roller thereby contacts the powder and builds a layer of the powder on the surface. The coating step is performed such as to avoid transmitting any significant shearing strain to preceding layers, thereby precluding destruction of the preceding layer formed in a similar manner.

When dispensing powders through use of such methods, it has been found that with highly agglomerating powders, such as those comprising binders or very finely grained particulate matter, it is difficult to achieve a uniform and thin layer of the particulate matter, since the powder tends to lump and cling to the roller.

A further disadvantage of a counter rotating roller when using particulate matter that tends to lump, is that all parts that come in contact with the particulate matter become severely soiled, thereby requiring more frequent maintenance work that leads to higher costs.

U.S. Pat. No. 6,036,777 is directed at an apparatus for dispensing powder on to a surface. A spreader movable relative to the coated surface distributes powder layers over the surface, and comprises a vibratory mechanism to compact the powder.

Patent application DE 101 17 875 filed subsequently describes a method and apparatus for dispensing fluids on to a surface to be coated, comprising a blade traversing along said surface, whereby the fluid is dispensed in front of said blade, whereafter the blade is swept across the dispensed fluid such that it imparts vibrations in the form of a rotary motion. The blade vibrates while sweeping over the surface to be coated, at a specific frequency about a point situated above the blade's point of contact to said surface. The blade's motion itself spans just a few degrees at an amplitude of 0.5 to 1.5 mm in the sweeping direction, depending on the leverage about the blade's contact point.

In comparison to a static blade, application of such an oscillating or vibrating blade reduces not only the shearing forces on the surface of the powder, but also enables the powder bed to be compacted to a greater degree.

One further advantage of an oscillating blade is the ability to apply a non-flowing particulate matter for coating a surface.

In such an embodiment of a blade that vibrates vertically or in the form of a rotary motion, during the coating sweep the blade must push a quantity of particulate matter ahead of itself that is sufficient to coat the entire surface.

Such methods, however, have several significant disadvantages, in that compaction of the layer is dependent on the quantity of particles lying in front of the blade. This means that compaction of the particulate bed may be greater at the beginning versus the end of the coating sweep, when the particulate supply has been essentially used up. Such a difference in compaction appears, for example, as a displacement wave in the existing particulate bed at the start of the coating sweep, which destroys the previously compacted structure. It is possible to counteract this destructive effect, if the amount of particulate matter needed is significantly less than the total quantity lying in front of the blade. However, the problem that arises then is that particulate matter in excess after the coating sweep must either be disposed of as waste, or a complicated lifting means and another coating sweep in the reverse direction are needed to return the excess material to the storage bin. The outcome is a more complex system comprising an apparatus with lifting and bidirectional coating mechanisms. Also, in such an embodiment the printer is able to accomplish its tasks only after each second coating sweep, which leads to significant extra costs.

Another disadvantage of such an embodiment is that particulate matter in front of the blade lies loosely over the surface just printed and may either impair the printing image of the preceding layer, or in rapid prototyping techniques it may come in contact with the printed curing agent of the preceding layer, leading to undesirable hardening effects at unknown locations. In addition, it has been found that when the particulate matter is mixed with one component of a two-component adhesive, the particles accumulate to form a cylinder-shaped dam in front of the coating blade, which at times hinders some of the particulate matter from getting under the coater and leads to undesirable gaps in the newly coated layer. Furthermore, excess loose particles flow in the direction of the blade's longitudinal axis, whereby without some lateral restriction a sort of particle wall builds up on the sides. Such a wall on the edge of the working surface, however, is unacceptable, since the gap between the printer and the surface to be printed is small and the printer will unavoidably touch the wall.

Hence, it is the object of this invention to provide a method, an apparatus, and an application of the apparatus for improved distribution of a fluid dispensed only in small quantities on to a surface to be coated.

In accordance with the invention, this requirement is fulfilled with a method for use in dispensing fluids of the kind stated above, comprising a fluid fed through the bottom outlet of a container vibrated cooperatively with a blade.

According to a preferred embodiment of the invention, the said vibration is in the form of a rotary motion that not only leads to significantly lower shear strains on the fluid surface but also a greater degree of compaction of said fluid.

In addition, it can be equally advantageous if the vibration occurs in a direction essentially perpendicular to the surface to be coated, or primarily vertically.

This method can be implemented preferably with an apparatus for dispensing fluids on to a surface to be coated, comprising a blade traversing along the surface and a metering device situated in front of the blade, whereby the metering device dispenses fluids on to said surface swept across thereafter by the blade, which is affixed in a manner such that it can impart vibrations. The metering device is arranged as a container carrying the particulate matter, has a bottom outlet, and is vibrated cooperatively with the blade.

The apparatus is preferably arranged such that said container and blade are affixed to each other.

According to a preferred embodiment, the container is arranged essentially as a hopper.

An especially preferred embodiment of the invention comprises a hopper with a bottom outlet situated in front of the coating blade and affixed rigidly to the blade, and operative to vibrate with the blade. The hopper carries a supply of particulate matter adequate to cover at least one coating sweep over the full length of the working surface. Actuation of the hopper's vibration mechanism causes the particulate matter in the hopper to fluidize and flow through the said bottom outlet to the front of the blade. Alternatively, the particulate matter remains in the hopper when the slit that defines the bottom outlet is set accordingly. Hence, the hopper can carry a much larger quantity of material than is required for the current layer.

This embodiment not only generates less waste, but it also reduces the demands on the metering system for feeding the particulate matter in the hopper to the extent that the system needs to merely distribute material in the hopper uniformly along the longitudinal axis of the coater. In accordance with the method of the invention, the precise quantity conveyed through the metering system is of subordinate significance, if the metered amount is always less than the remaining space in the hopper. As such, overfilling through a single filling stage is effectively avoided.

A level detector could preferably be used to monitor any potential overfilling or lack of supply in the hopper, and the hopper could be topped up as needed from a storage bin.

The embodiment of the hopper can be relatively simple. The hopper may be formed, for instance, from sheet metal equal in length to the width of the coater affixed by means of a spacer to the front of the blade. The critical aspects in an embodiment of the invention are the settings for the slit width $B_S$ at the hopper's outlet and the gap H of the hopper's sheet metal wall above the coating blade's contact point. The gap H is defined as the height of the slot that forms between the lowest edge of the hopper's wall and the contact point of the coating blade, measured from the neutral position of the system that vibrates rotationally or just oscillates.

It is apparent that in an embodiment where the blade vibrates in only a vertical direction that is perpendicular to the coated surface, the dimension H is not particularly critical, since the blade can no longer sink into the preceding layer while rotating.

In a preferred embodiment of the invention, the angle of the hopper should lie between 15 and 30 degrees, depending on the particulate matter used.

In a preferred embodiment of the invention, the slit width $B_S$ should preferably be calculated as follows:

Given a layer thickness of $H_S$ and a post-coating bulk density of the particulate matter of $\rho_S$, the coating speed is defined by the equation:

$$V_B = \frac{\dot{M}_S}{H_S \cdot B_S \cdot \rho_S}$$

For good coating results, the slit width $B_S$ must be calculated such that the flow rate $\dot{M}_T$ at which the particles exit the hopper to reach the front of the coating blade is equal to the particle flow rate $\dot{M}_S$ required for the selected coating speed $V_B$. In other words, $\dot{M}_T = \dot{M}_S$.

If the particle flow rate from the hopper is less than that defined above, either gaps will occur or the material's bulk density will be too low. Alternatively, if the particle flow rate is greater than that defined above, the particle pressure in front of the blade will rise and damage the preceding layers, since shear forces that develop within the particulate matter will lead to the same negative effects that arise when using a coater without a hopper.

The particle flow rate $\dot{M}_T$ is dependent on three variables: the vibration frequency, the slit width $B_S$, and the gap H. Increasing these parameters raises the particle flow rate $\dot{M}_T$. However, if the selected slit width $B_S$ is too large, primarily the pressure of the material on the preceding layer becomes too high and thereby compacts the sand excessively, generating all the attendant undesired negative side effects.

The gap H should be selected upon consideration of the following aspects:

Oscillation of the system comprising the coating blade and the hopper wall is in the form of a rotary motion, which occurs not only in the traversing direction but also vertically. The fulcrum of the arrangement is selected to achieve a specified stroke length at the underside of the vibrating blade, which permits controlled compaction of the bulk particulates. In order to avoid damaging the underlying printed image, this stroke must be matched to the potential degree of compaction of the particulate matter, especially when considering materials comprising high density particles that exhibit a low bulk density. This is exemplified by quartz with a solid density of about 3.6 kg/l, versus a particle density of around 1.6 kg/l for quartz sand. Depending on the material composition, the stroke of the blade can be set in relation to the layer thickness, thereby permitting a larger amount of particulate matter to be conveyed under the blade and compressed during the return stroke.

The hopper wall in this embodiment is situated in front of the blade, and thus pitches even more than the blade. The low point of the movement and hence the gap H of the hopper wall from the underside of the coating blade must be set to ensure that the hopper wall does not touch the preceding layer.

In accordance with a preferred embodiment, the front edge of the blade has a radius r, preferably between 2 and 4 mm.

In accordance with the method of this invention, the blade is vibrated preferably through a cam, fixed in a torsionally rigid manner to the driveshaft of the motor. Power may be transmitted from the cam to the vibrating blade, for example, through either positive displacement, i.e. a roller bearing actuating the cam directly, or through non-positive displacement, i.e. a spring-force actuated cam.

As mentioned earlier, the apparatus in accordance with the invention is particularly suited for applying particulate matter comprising a binder, especially in a method for use in building casting patterns.

Other advantageous arrangements of this invention emerge from the subclaims and description. Reference is made to the subsequently filed patent DE 101 17075, which is incorporated by reference as if fully set forth herein, in respect of other arrangements of the method and apparatus in accordance with the invention.

Preferred embodiments of the invention are described below in more detail with the help of the accompanying drawings, in which:

Figure A depicts the sequence of the method in accordance with the invention, and Figure B depicts the apparatus in a first preferred embodiment in accordance with the invention, and Figure C depicts the apparatus in a second preferred embodiment in accordance with the invention.

Examples of the method and apparatus in accordance with the invention are illustrated below for use in rapid prototyping applications to build patterns in layers from particulate matter, binders, and curing agents.

In particular, it is assumed that the particulate matter comprises a binder that tends to lump easily, whereby great demands are placed on the coating process.

The application of such particulate matter is advantageous in rapid prototyping, since the step normally required to coat the particulate matter with a binder is eliminated and patterns can be built faster and cheaper.

The method and apparatus in accordance with the invention have been found to be especially advantageous when using particulate matter that tends to agglomerate.

Not only particulate matter comprising a binder but also materials with grain sizes under 20 μm and wax powders tend to agglomerate easily, such that the method in accordance with the invention is especially advantageous when applied to fluids.

The coating sequence for a preferred embodiment of the method in accordance with the invention is described below in more detail with the help of the accompanying drawings.

Figure A is an exemplary depiction of a method to build a part such as a casting pattern. Working surface 4 on which the mold is to be built is lowered by one layer thickness of particulate matter 5, whereafter the desired layer thickness of particulate matter 5, which in accordance with a preferred embodiment of the invention is quartz sand containing 1% by weight of binder (e.g. Capaset 0401 or Resifix from the company Hüttenes), is dispensed from a container, in this case hopper 3, on to working surface 4. This step is followed by selective dispensing of the curing agent on areas to be hardened, through for example a drop-on-demand system like that of an ink-jet printer. These dispensing steps are repeated until a finished part embedded in loose particulate matter 5 is obtained.

To start, coater 1 is located at its initial position depicted in Figure A1, where it is first filled up by storage bin 2, if the level indicator senses a low quantity in the container, shown here as hopper 3.

As depicted in Figure A2, working surface 4 is subsequently lowered by more than one layer thickness to build the pattern.

Thereafter, as shown in Figure A3, coater 1 traverses without oscillating and thus without feeding any material, away from storage bin 2 until it is past the edge of working surface 4.

As is apparent from Figure A4, working surface 4 is now set precisely at the layer level, which means it is lowered precisely by one layer thickness.

As depicted in Figure A5, coater 1 now starts oscillating and sweeps steadily across working surface 4, which it coats by dispensing the proper quantity of particulate matter 5.

Coater 1 thus ends up at its starting position and can again be filled up by storage bin 2, if necessary, as illustrated in Figure A6 that is similar to Figure A1.

In order to balance out any unevenness in the filled level across the width of coater 1, hopper 3 can be emptied after a given duration by oscillating it in a standing position over waste container 6, whereafter it can be refilled.

The printing or exposure process for hardening the particulate matter 5 containing a binder can naturally be done during or after coating.

Figure B illustrates a preferred embodiment of an apparatus in accordance with the invention.

Also when applying the method in accordance with the invention, an apparatus in accordance with a preferred embodiment is especially suited for dispensing particulate matter 5 on to a surface to be coated, whereby in the traversing direction 16 of blade 7 is a metering device situated in front of blade 7, and said device dispenses particulate matter 5 on to working surface 4, across which blade 7 is swept. Blade 7 is arranged on coater carrier 10 such that it imparts vibrations in the form of a rotary motion. Coater carrier 10 stretches over the full width of working surface 4 and sweeps across the entire working surface 4. In accordance with this exemplary preferred embodiment, the axis of rotation 9 of blade 7 is perpendicular to the traversing direction marked by arrow 16 and parallel to the longitudinal axis of blade 7.

The metering device in this embodiment is a hopper 3, formed of an appropriate sheet metal wall 17, affixed with a spacer to the front of blade 7.

Sheet metal 17 is arranged such that the value of slit width $B_S$ validates the equation, $$V_B = \frac{\dot{M}_S}{H_S \cdot B_S \cdot \rho_S},$$

whereby $H_S$ is the layer thickness, $\rho_S$ the post-coating bulk density of the particulate matter, $\dot{M}_T$ the flow rate of particles exiting from hopper 3, and $\dot{M}_S$ the particle flow rate required for the selected coating speed $V_B$.

In accordance with the exemplary embodiment, gap H from the underside of blade 7 to wall 17 of hopper 3 is as small as possible and set up such that said wall does not touch the preceding layer.

The system comprising blade 7 and hopper 3 oscillates not only in the traversing direction marked by arrow 16, but also vertically. The oscillatory motion is indicated by arrow 8. As stated in detail above, the axis of rotation 9 for the arrangement of blade 7 is selected such that a specified stroke length marked by arrow 8 is achieved at the underside of the blade.

Blade 7 is arranged such that its angle of rotation about axis 9 is 0.1 to 5 degrees along the direction in which particulate matter 5 is built up, whereby axis 9 is situated above the surface to be coated.

Hopper 3 can be supplied with particulate matter 5 from storage bin 2 by any means known to those skilled in the art, such as a conveyor belt used to feed material from a reservoir.

In particular, it is possible that the material may be supplied according to the methodology described in patent DE 195 30 295, which is incorporated by reference as if fully set forth herein.

The apparatus of this invention is also arranged such that blade 7 is driven by at least one high speed electric motor, which vibrates said blade via one cam 12.

In this embodiment, if for example the motor that drives cam 12 rotates at 3,000 rpm at 12V and the stroke of the cam is 0.54 mm, the amplitude of the blade edge is 0.85 mm, whereas at 15V the rotation speed was measured at 4,050 rpm, which is equivalent to 67.5 Hz. Depending on the width of blade 7, it may be necessary to include several drive points.

Furthermore, blade 7 has rounded edges 13 such that particulate matter 5 enters by flowing around a radius on one edge of said blade. Such a radius can be formed, for example, by lightly breaking the edges, whereby the edge radii and as described earlier are preferably in the range of 2 to 4 mm.

In a further preferred embodiment, if blade 7 is made up of two parts comprising a shaped blade part 14 and a holder 15, part 14 can be unscrewed and replaced if, for example, it is damaged through wear.

Figure C illustrates a further preferred embodiment of the invention, which is different from the embodiment shown in Figure B essentially in that the vibration of blade 7 and hopper 3 is not in the form of a rotary motion, but instead occurs in a vertical direction that is basically perpendicular to working surface 4. Arrow 8 indicates the direction of vibratory motion. In all other aspects, numbered elements of Figure C represent equivalent ones in Figure B. As for the embodiment exemplified in Figure B, the frequency and vertical amplitude of the vibrations in Figure C are also selectable.

The invention claimed is:

1. An apparatus for dispensing particulate matter in a layer, on to a surface to be coated, comprising:
    a coater carrier that stretches over the full width of the surface to be coated and adapted to move across the length of the surface in a direction in which the particulate matter is built up;
    a blade assembly rotatably attached to the coater carrier at an axis point, the blade assembly including:
        a holder portion and a removable shaped blade portion with an outside blade edge,
        a metering device with an outside wall for carrying and dispensing, via an opening, the particulate fluids, the metering device connectively disposed in front of the blade assembly such that the outside wall maintains a gap as small as possible over a preceding layer,
    a cam mechanism connectively disposed to the coater carrier and rotatably connected to the holder portion, the cam mechanism adapted to impart a vertical and a horizontal oscillatory vibration with an amplitude of at least 0.85 mm at the outside blade edge or an oscillatory angular rotational of 0.1 to 5 degrees about the axis point of the blade assembly along the direction in which the particulate matter is built up.

* * * * *